(12) United States Patent
Hale

(10) Patent No.: US 11,603,957 B2
(45) Date of Patent: *Mar. 14, 2023

(54) DRAIN PIPE TREATMENT SYSTEMS AND RELATED METHODS

(71) Applicant: Tony Hale, Cottonwood Heights, UT (US)

(72) Inventor: Tony Hale, Cottonwood Heights, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,179

(22) Filed: Oct. 18, 2021

(65) Prior Publication Data

US 2022/0112976 A1 Apr. 14, 2022

Related U.S. Application Data

(63) Continuation of application No. 16/145,720, filed on Sep. 28, 2018, now Pat. No. 11,156,320.

(Continued)

(51) Int. Cl.
*F16L 55/38* (2006.01)
*B05B 1/04* (2006.01)
*B08B 9/04* (2006.01)
*E03F 9/00* (2006.01)
*B05C 7/08* (2006.01)
*B08B 9/043* (2006.01)
(Continued)

(52) U.S. Cl.
CPC ............. *F16L 55/38* (2013.01); *B05B 1/046* (2013.01); *B05B 13/0636* (2013.01); *B05C 7/08* (2013.01); *B08B 9/04* (2013.01); *B08B 9/043* (2013.01); *E03F 9/00* (2013.01); *A01M 7/0032* (2013.01); *B05B 15/65* (2018.02); *F16L 2101/10* (2013.01); *F16L 2101/12* (2013.01)

(58) Field of Classification Search
None
See application file for complete search history.

(56) References Cited

U.S. PATENT DOCUMENTS 3,814,330 A 6/1974 Masters
4,073,302 A 2/1978 Jones
(Continued)

OTHER PUBLICATIONS

PCT Application No. PCT/US18/53332, Filing Date Sep. 28, 2018, Tony Hale, International Search Report. dated Jan. 2, 2019: 12 Pages.

*Primary Examiner* — Shamim Ahmed
*Assistant Examiner* — Bradford M Gates
(74) *Attorney, Agent, or Firm* — Jason Jones

(57) ABSTRACT

A system for applying a chemical agent within a pipe includes a skid assembly, moveable longitudinally within the pipe. The skid assembly has a bottom positionable on a bottom, internal portion of the pipe. A delivery nozzle is carried by the skid assembly and is coupleable to a chemical agent supply. A dispensing tip delivers a controlled stream of chemical agent within the pipe toward an internal surface of the pipe. The tip is held at or above a surface of fluid carried by the pipe while at least a portion of the skid assembly is positioned below the fluid surface. The dispensing tip is limited from delivering the chemical agent downwardly toward the bottom of the skid assembly such that the dispensing tip delivers the controlled stream of chemical agent upwardly away from the bottom surface of the pipe and upwardly away from the fluid surface.

14 Claims, 8 Drawing Sheets

Related U.S. Application Data

(60) Provisional application No. 62/565,328, filed on Sep. 29, 2017.

(51) Int. Cl.
  *B05B 13/06*  (2006.01)
  *A01M 7/00*  (2006.01)
  *F16L 101/10*  (2006.01)
  *B05B 15/65*  (2018.01)
  *F16L 101/12*  (2006.01)

(56) References Cited

U.S. PATENT DOCUMENTS

| | | |
|---|---|---|
| 4,699,463 A | 10/1987 | D'Amelio et al. |
| 4,944,320 A | 7/1990 | Waite et al. |
| 4,981,524 A | 1/1991 | Waite |
| 5,213,120 A | 5/1993 | Dickson |
| 5,244,505 A | 9/1993 | Allison et al. |
| 5,735,955 A | 4/1998 | Monaghan et al. |
| 6,699,324 B1 | 3/2004 | Berdin et al. |
| 7,998,276 B1 | 8/2011 | Baugh |
| 8,974,604 B2 | 3/2015 | Baziuk |
| 9,468,954 B1 | 10/2016 | Olsson et al. |
| 11,156,320 B2 * | 10/2021 | Hale ................... B05C 7/08 |
| 2003/0039752 A1 | 2/2003 | Winiewicz et al. |
| 2006/0266134 A1 | 1/2006 | MacMillan et al. |
| 2014/0083464 A1 | 3/2014 | Paris |
| 2015/0331136 A1 | 11/2015 | Tinlin |

\* cited by examiner

DRAIN PIPE TREATMENT SYSTEMS AND RELATED METHODS

PRIORITY CLAIM

This is a continuation of U.S. patent application Ser. No. 16/145,720, filed Sep. 28, 2018, which claimed priority of and to U.S. Provisional Patent Application Ser. No. 62/565,328, filed Sep. 29, 2017, each of which is hereby incorporated herein by reference in its entirety.

BACKGROUND OF THE INVENTION

Field of the Invention

The present invention relates generally to systems and methods for treating internal areas of pipes, drains, conduits and the like to aid in the removal or prevention of roots and similar items that have entered the pipes.

Related Art

Enclosed drainage systems, such as sewer pipes and similar structures, may over time become clogged with vegetation or the roots of vegetation or trees. Such intrusion into the pipe can restrict flow of fluid and/or sewage through the pipe. As most such pipes are too small to be accessed manually, conventional systems have been developed that allow the introduction of a chemical agent within the pipe. This chemical agent acts to kill the vegetation or roots and restore flow through the pipe. While such known systems have proven somewhat effective, there remains a need to apply such chemical agent sparingly and accurately to more efficiently treat affected areas inside such pipes.

SUMMARY OF THE INVENTION

In accordance with one aspect of the invention, a system for applying a chemical agent within a pipe is provided, including a skid assembly, moveable longitudinally within the pipe. The skid assembly can have a bottom positionable on a bottom, internal portion of the pipe. A delivery nozzle can be carried by the skid assembly and can be coupleable to a chemical agent supply. A dispensing tip can be carried by the delivery nozzle, the dispensing tip being configured to deliver a controlled stream of chemical agent within the pipe toward an internal surface of the pipe. The dispensing tip can be held at or above a surface of fluid carried along the bottom, internal portion of the pipe while at least a portion of the skid assembly is positioned below the fluid surface. The dispensing tip can be limited from delivering the chemical agent downwardly toward the bottom of the skid assembly such that the dispensing tip delivers the controlled stream of chemical agent upwardly away from the bottom surface of the pipe and upwardly away from the fluid surface.

In accordance with another aspect of the technology, a system for applying a chemical agent within a pipe is provided, including a skid assembly, moveable longitudinally within the pipe, the skid assembly having a central body, A delivery nozzle can be carried by the skid assembly and can be fluidly coupleable to a chemical agent supply. A dispensing tip can be carried by the delivery nozzle, the dispensing tip being configured to deliver a controlled stream of chemical agent within the pipe toward an internal surface of the pipe, the dispensing tip being held at or above a surface of fluid carried along the bottom, internal portion of the pipe while at least a portion of the skid assembly is positioned below the fluid surface. The dispensing tip can be limited from delivering the chemical agent downwardly toward the bottom of the skid assembly such that the dispensing tip delivers the controlled stream of chemical agent upwardly away from the bottom surface of the pipe and upwardly away from the fluid surface. One or more blades can extend from the central body, the blades operable to space the central body from the internal portion of the pipe.

In accordance with another aspect of the technology, a method is provided of treating an inside surface of a pipe. The method can include positioning a skid within the pipe, the skid being moveable longitudinally within the pipe and including a central body, a delivery nozzle, and at least one fin extending from the central, the fin spacing the central body from a bottom of the pipe. A pressurized fluid can be applied to a delivery nozzle carried by the skid to cause the skid to move to position the skid in a desired longitudinal location within the pipe. A pressurized chemical agent can be applied through a dispensing tip carried by the delivery nozzle to thereby deliver a controlled amount of the chemical agent toward an internal surface of the pipe.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
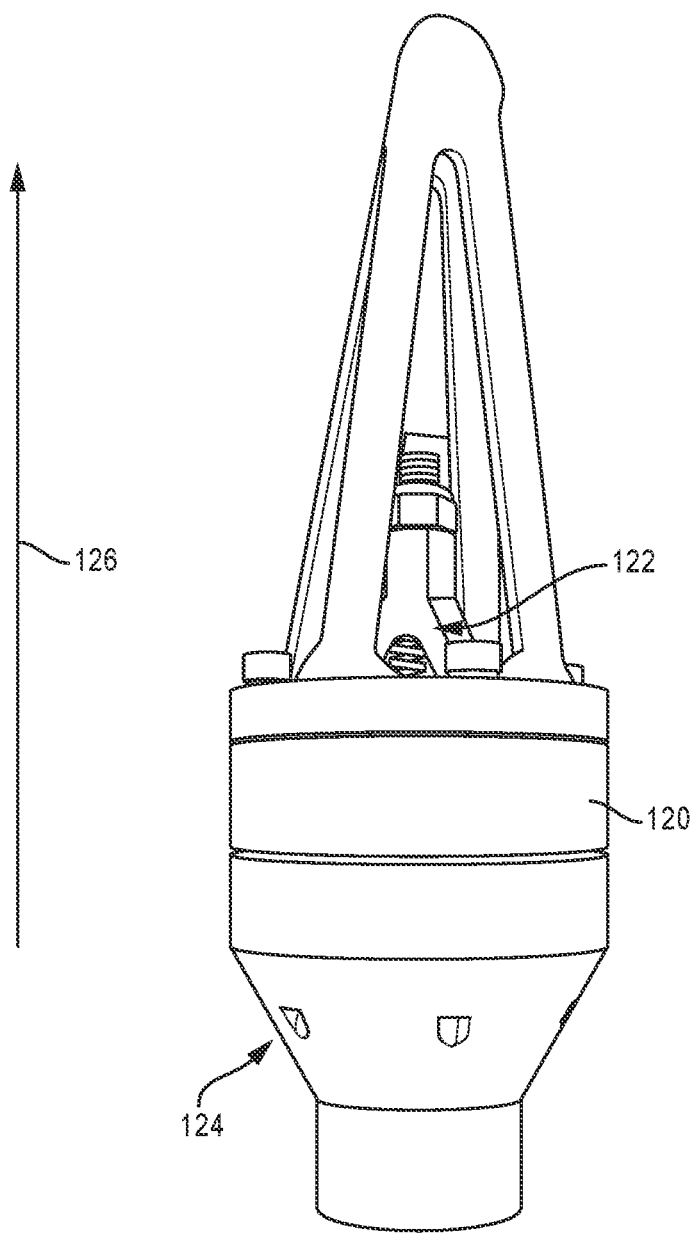
FIG. 1 shows a portion of a component of a Prior Art pipe treatment apparatus.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "an orifice" can include one or more of such orifices, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms can sometimes be used herein to describe and claim various components of the present invention, Such terms include, without limitation, "upward," "downward," "horizontal," "vertical," etc. These terms are generally not intended to be limiting, but are used to most clearly describe and claim the various features of the invention. For example, pipes are sometimes referenced herein as being generally horizontal. It is understood that many pipes are sloped to some degree or another from horizontal. Where such terms must carry some limitation, they are intended to be limited to usage commonly known and understood by those of ordinary skill in the art in the context of this disclosure.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to systems and methods for treating internal portions of pipe. Pipes treatable with the present technology include, without limitation, sewage pipes, water delivery pipes, drainage pipes, etc. The term "pipe" is used generically herein: it is to be understood that such usage encompasses conduits, ducts, channels, etc., as those terms may be understood to refer to passages through which liquids travel. Such pipes are generally buried beneath the surface of the ground, and as such are easily accessible only at terminal ends or junctions. As such pipes are buried in the ground, vegetation can intrude within the pipes and interfere with normal flow through the pipes. Such vegetation can take a variety of forms, and as that term is used herein, can include various weeds, plants, etc., as well as the roots of such plants, the roots of trees, etc.

When the growth of such vegetation into a particular pipe begins to impede flow within the pipe, conventional methods have been developed to apply a chemical agent within the pipe to kill the vegetation. One component of a prior art system for applying a chemical agent within a pipe is shown in FIG. 1. In this prior art system, a nozzle 120 is provided, said nozzle generally being coupled to a length of a hose (not shown) that is in turn coupled to a pumping system. The pumping system can be, but is not always, mounted to a vehicle for ease of transportation and power access.

The prior art nozzle includes a spring valve 122 that is normally open: e.g., it allows flow through the valve when subject to a low-pressure condition. When the nozzle is subject to a higher-pressure condition, the spring valve closes, and forces flow through orifices 124. At relatively high pressure, flow through these orifices tends to move the nozzle 120 in direction 126. Typically, the assembly is placed in a pipe, and water is forced through the nozzle (and out orifices 124) causing the nozzle assembly to travel away from the entry position and down the length of the pipe. The nozzle is typically positioned at the end of a "run" in this manner.

Once positioned, high-pressure flow of water through the prior art nozzle 124 is discontinued, and a foaming chemical agent is applied through the hose at a relatively low pressure. As the spring valve 122 is maintained open at this low pressure, the chemical agent eventually makes its way through the hose and is allowed to flow out through the valve. In this prior art system, the chemical agent flows out of the valve and creates a foam "slug" that is intended to fill the pipe cross section and thereby treat vegetation within the pipe. The nozzle assembly can be slowly retracted through the pipe (generally by retracting the hose to which the nozzle is attached) while foam is ejected to treat lengths of the pipe.

While this system has proved somewhat effective for treating and killing vegetation within pipes, it suffers from a number of problems. For example, because the pipe is essentially filled with a foam slug (aside from portions of the pipe where fluid flow is occurring), a great deal of chemical agent is utilized to ensure all vegetation present is treated. This is not only wasteful, but also results in the introduction into the pipe of a larger quantity of harmful chemicals than may be necessary.

In addition, treatment of the pipe is often done in normal operating conditions, with fluid flow still present within the pipe. Thus, as the foam slug is being generated by the nozzle, the fluid flow can be carrying chemical agent away from the nozzle, impeding creation of the foam slug, wasting chemical agent and introducing more chemical agent into the system than is necessary.

The present system addresses these shortcomings by providing a system that uses much less chemical agent than previously required, and allows for more precise and effective treatment of only affected areas of the pipe. Turning now to FIG. 2A, in one example the system 10*a* includes a skid or sled 14 which is typically sufficiently weighted that it tracks along the bottom surface of a pipe 15. The assembly is moveable along the length of pipe 15, and is generally coupled to a hose (not shown) via coupling 18. The assembly includes a nozzle 12 that is similar in operation to the nozzle 120 shown in FIG. 1. In this aspect of the invention, however, a dispensing tip 16 is provided that allows very precise application of a chemical agent within the pipe.

The sled or skid 14 can include a variety of components that facilitate movement of the skid along the interior of the pipe 15. In the examples shown, the skid or sled includes a central body assembly and a plurality of fins or blades that extend therefrom. As shown, for example, in FIG. 7, four fins or blades can be provided that allow the skid to slide easily within the pipe. Note that the fourth fin or blade in FIG. 7 is not clearly shown, as it is obscured by the pipe structure forming a portion of the skid body. While not so required, small wheels or bearings can be provided on the fins or blades to facilitate movement of the skid within the pipe.

In use, the assembly is generally introduced into a pipe 15 near an opening accessible by a technician. Once positioned in the pipe, high-pressure water is applied to the nozzle 12, which causes the nozzle to propel the skid down the length of the pipe. While the pressure used in this high-pressure condition can vary, in one embodiment about 1,200-3,000 psi (pounds per square inch) water is used to "shoot" the skid through the pipe. Once positioned where desired, the high-pressure water is discontinued and a chemical agent is forced through the hose at a relatively low pressure (on the order of 350 psi or less). In this low-pressure condition, the nozzle 12 is open, and water that previously filled the hose is forced out of dispensing tip 16 into spray pattern 20. After a short period of time, the water in the hose has been sprayed out and the chemical agent at least partially fills the hose and is being dispensed through the dispensing tip.

As shown in more detail in FIGS. 5A through 5C, the dispensing tip 16, 16*a* includes one or more orifices 24, 24*a*, 24*b*, etc. The orifices are strategically formed and oriented to produce a controlled spray of the chemical agent to allow efficient and accurate treatment of vegetation contained within the pipe 15. In the example shown in FIGS. 2A through 4, the dispensing tip 16 includes orifice 24 that is oriented to produce a spray pattern 20 that is generally perpendicular to the elongate axis of the assembly (also perpendicular to the elongate axis of the pipe 15). Thus, as the assembly traverses the pipe, the spray pattern applies chemical agent in a controlled and efficient manner toward inside surfaces of the pipe.

The size and shape of the orifices can vary. In one example, the dispensing tip is formed from a galvanized pipe cap, or similar material, and the orifice comprises a slit formed through an outer shell of the cap. The orifice can include a width of about 1/16 of an inch. As discussed in more detail below, the orifice can extend across an arc defined between about 90 degrees and about 190 degrees.

Generally, the orifice 24 limits application of the chemical agent to an arc that is created above any fluid contained in the pipe. In the example shown in FIG. 2A, fluid level 17 is relatively low, and the dispensing tip 16 can be positioned about level with a centerline of the assembly. In cases where the fluid level 17 is higher, as shown for example in the system 10*b* of FIG. 2B, a riser assembly 26 can be utilized to elevate the dispensing tip 16 above the assembly and above the fluid level. Thus, the present system allows effective treatment of vegetation within the pipe at specific locations and with limited amounts of chemical agent.

While the components of the riser assembly 26 can vary depending upon the specific application at hand, in the example shown in FIGS. 2B and 4 can include a first coupler 26*a* that includes a 90 degree turn. A second coupler 26*b* can extend upwardly for some distance, after which coupler 26*c* again turns 90 degrees. An extension 26*d* can then extend for some distance and terminate at dispensing tip 16. In this manner, the riser assembly can elevate the orifice 24 to allow application of chemical agent above liquid level within the pipe while minimizing application of the chemical agent into the liquid.

In the examples shown in FIGS. 5A, 5B and 5C the dispensing tip 16*a* can include two or more orifices, 24*a* and 24*b* in the example shown. In this example, the orifices can be angled relative an axis "v" perpendicular to the elongate axis of the dispensing tip 16*a*. As shown, orifice 20*b* is angled forwardly relative to this axis, and orifice 20*a* is angled rearwardly of this axis. In the example shown, the angle $\alpha_2$ can be about 8 degrees and the angle $\alpha_1$ can be about 8 degrees.

It will be appreciated that vegetation is often extending into the pipe perpendicularly downward from inner pipe surfaces. Thus, when chemical agent is applied from the orifice 24, low-hanging vegetation may itself interfere with application of the agent to the vegetation. By orienting the orifices as shown, the system can better apply the chemical agent to front and/or rear surfaces of the vegetation, leading to a more effective treatment of the vegetation. By utilizing two such orifices in the arrangement shown, both the front and rear surfaces of the vegetation can be treated (as the dispensing tip passes near, under, then beyond the vegetation).

As shown in FIG. 5C, the orifice 24*b* can be sized and shaped to most effectively dispense the chemical agent. The orifice can be formed as a slit or slot in the dispensing tip 16*a* that allows a limited and controlled amount of chemical agent to be sprayed from the tip. The orifice can include an opening that spans an arc, shown by example at "$\alpha$." This arc can vary from about 190 degrees to about 90 degrees. In one example, the arc is selected such that all chemical agent is applied above a fluid level in the pipe, with no agent applied downwardly into the fluid.

FIGS. 6 and 7 illustrate an additional embodiment of the invention that includes skid or sled assembly 14, nozzle assembly 12, coupling 18 and dispensing tip 16, as in previous embodiments. In this example, however, the dispensing tip is coupled to a float 30 that can rise or fall based on fluid level within a pipe. The float is slidably coupled to frame or cage 32 that includes slots 34 formed therein. Generally, the frame or cage 32 is fixed relative to a body of the float. The float 30 is thereby slidably carried within slots 34, and can move freely upwardly and downwardly relative the skid 14, and relative to the body of the skid assembly. This assembly can be useful in large-scale pipes, on the order of 33 to 44 inches (or more) in diameter. For such large pipes, the skid 14 can ride along the bottom surface of the pipe, and can be weighted, if desired, to ensure it does not float (or is not unduly affected by fluid flow). Float 30 can ensure dispensing tip 16 finds the proper level (generally slightly above the fluid level in the pipe) to ensure the chemical agent is applied only where desired.

Coupling 18 can include a rotational or swivel component 18a that allows the dispensing tip or assembly as a whole to rotate or swivel relative to the hose to which the assembly is coupled. This aspect of the invention can be incorporated into a variety of positions along the assembly, so long as it provides rotatability to the dispensing tip relative to the pipe. This can ensure that the orifices 24, 24a, 24b, etc. are properly oriented toward inside surfaces of the pipe. Also, while not shown in detail, the present system can be used in combination with a camera system to allow an operator to view the inside of the pipe and only apply chemical agent where desired.

Figure 2A:
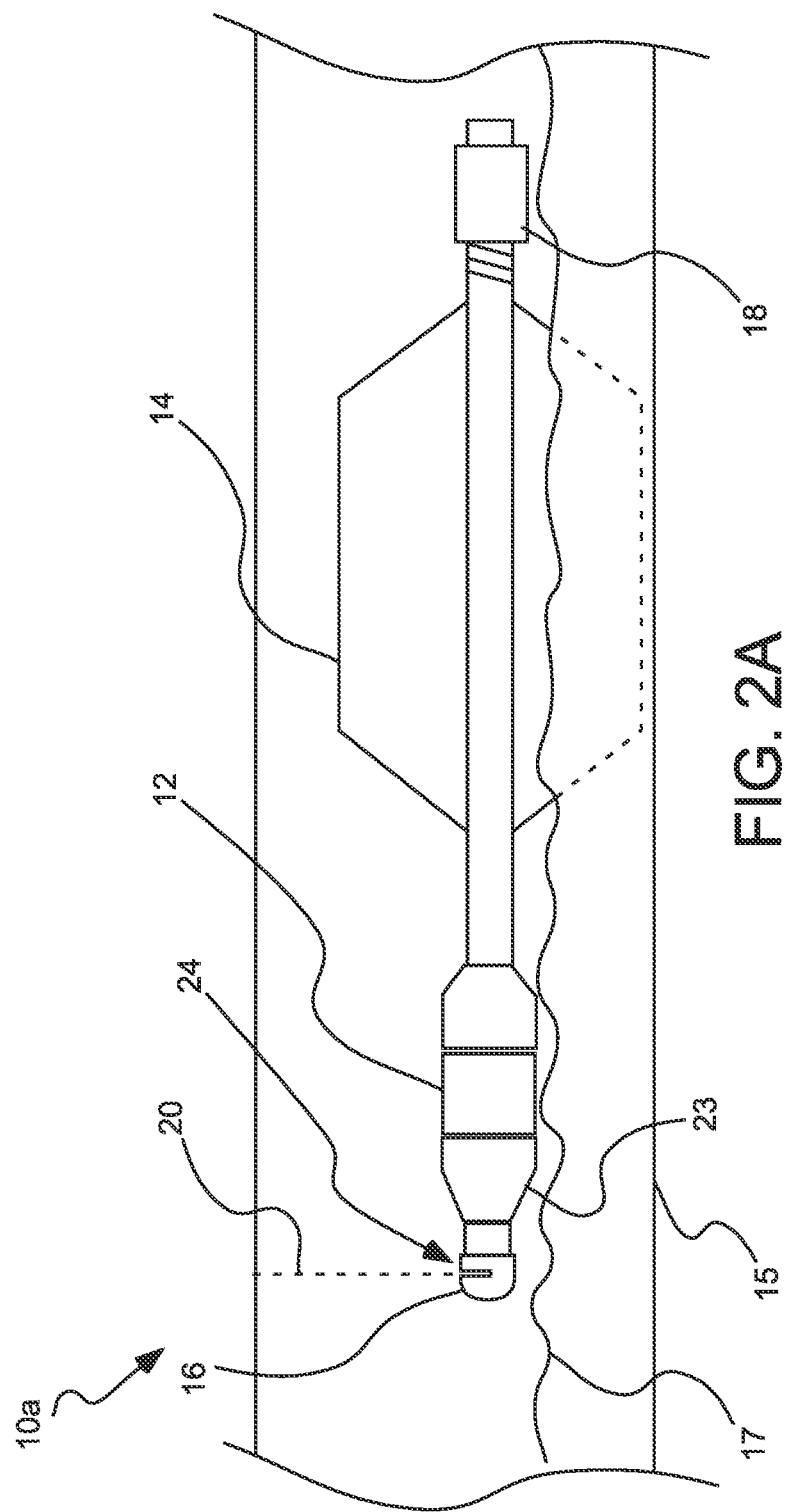
FIG. 2A is a schematic representation of a pipe treatment system in accordance with an embodiment of the invention.
Figure 2B:
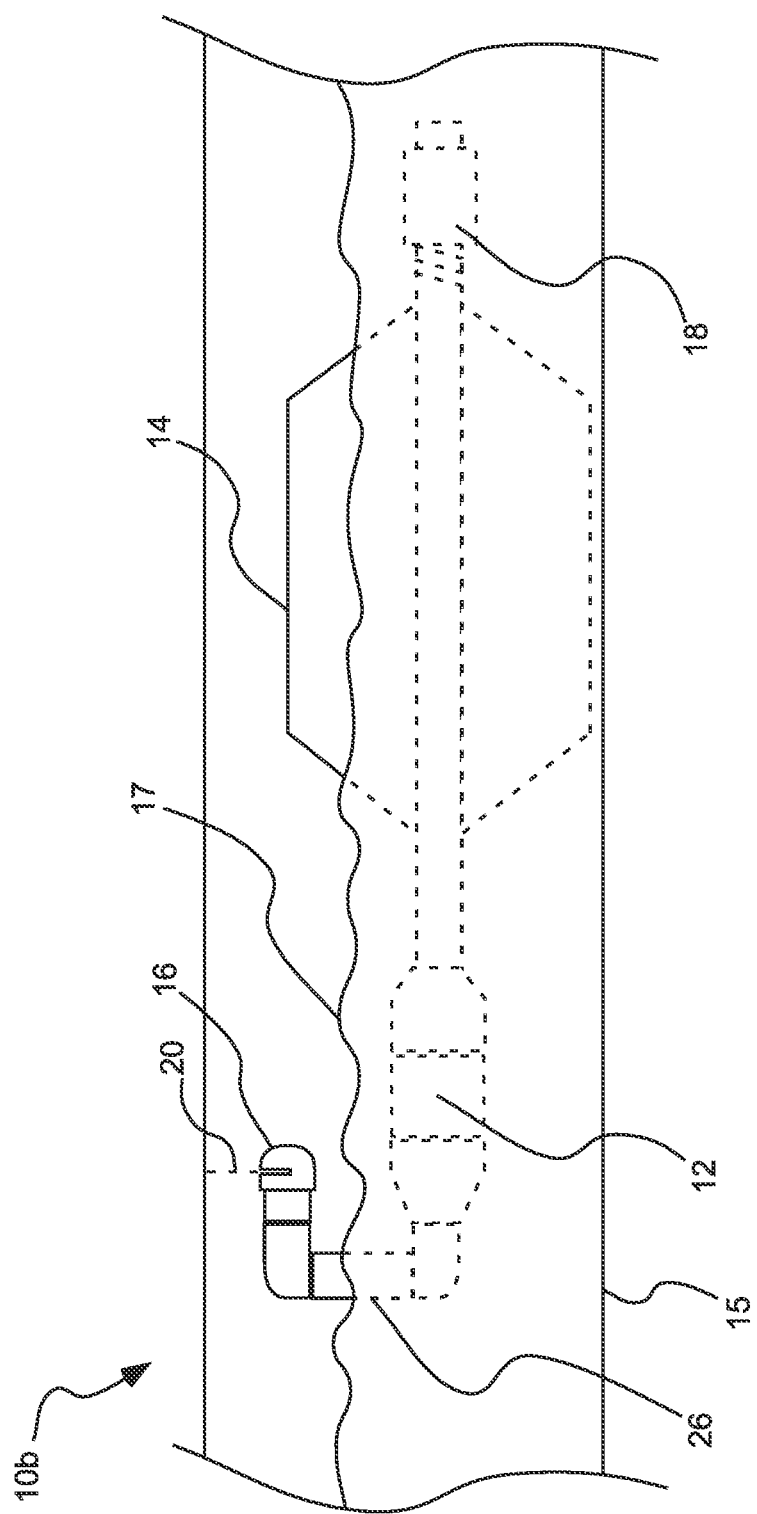
FIG. 2B is a schematic representation of a pipe treatment system in accordance with another embodiment of the invention.
Figure 3:
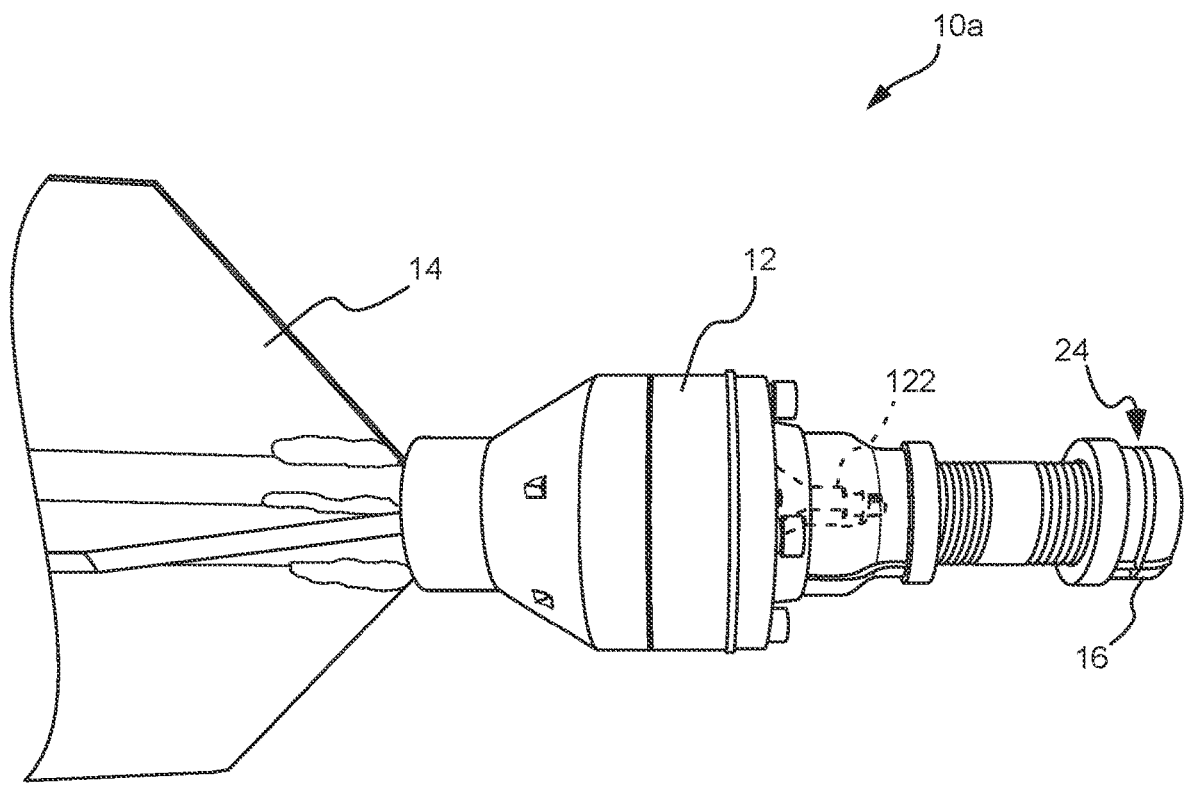
FIG. 3 is a more detailed view of a portion of the pipe treatment apparatus shown in FIG. 2A.
Figure 4:
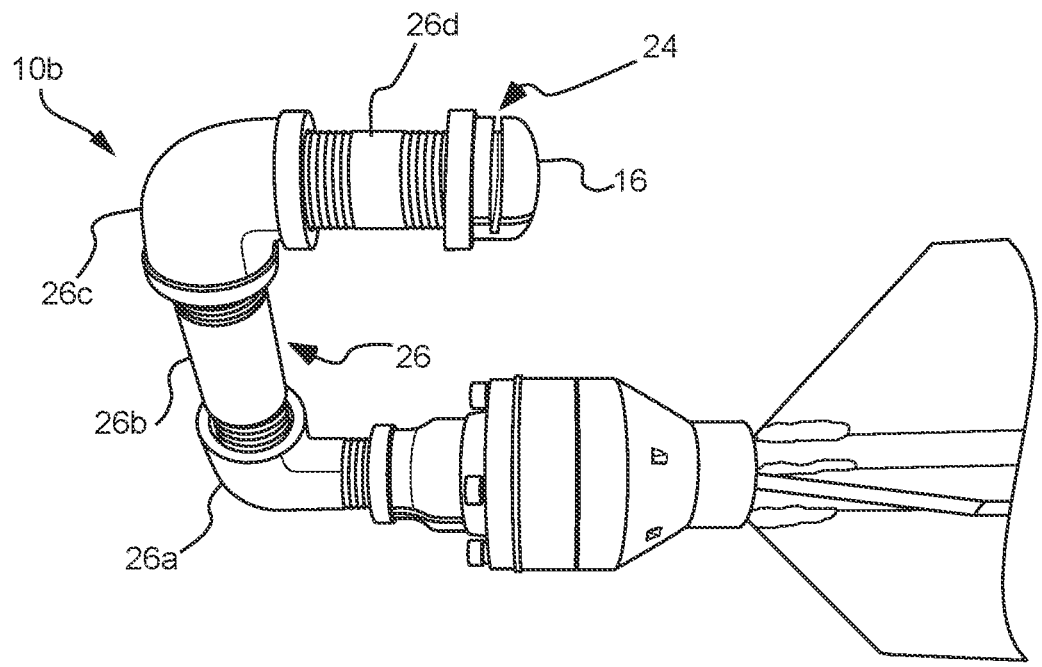
FIG. 4 is a more detailed view of the pipe treatment apparatus shown in FIG. 2B.
Figure 5A:
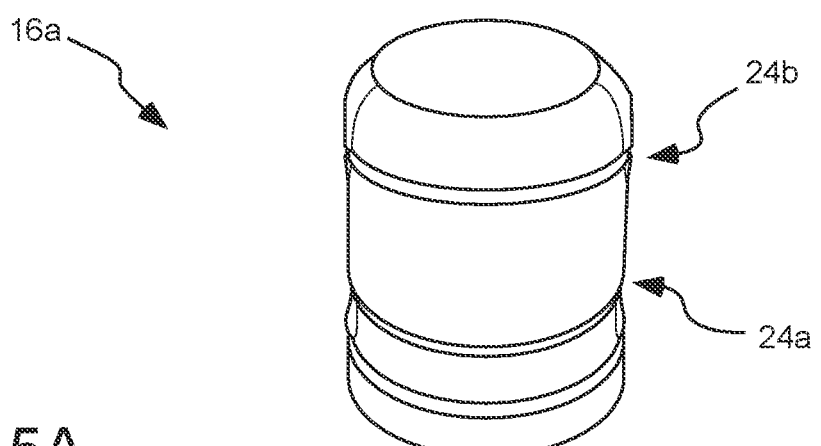
FIG. 5A is a more detailed view of a delivery nozzle dispensing tip in accordance with an embodiment of the invention.
Figure 5B:
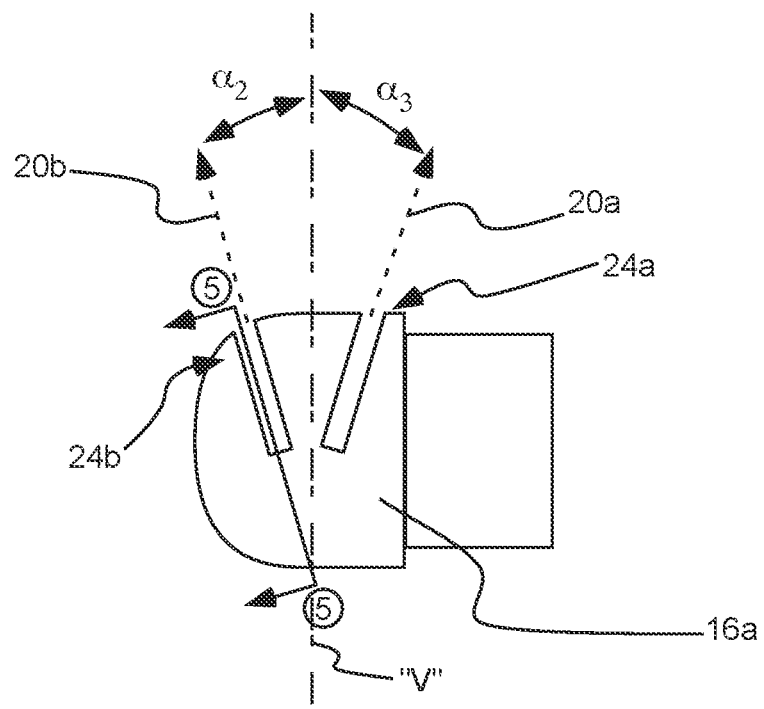
FIG. 5B is a schematic, side representation of the dispensing tip shown in FIG. 5A.
Figure 5C:
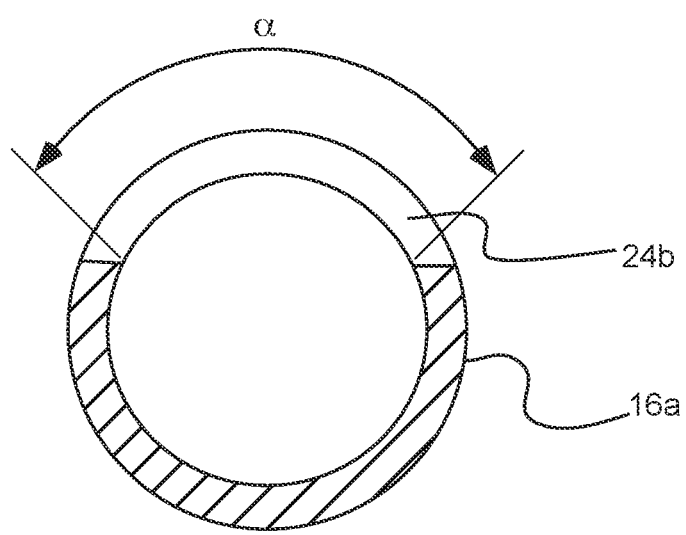
FIG. 5C is sectioned view of the dispensing tip of FIGS. 5A and 5B, taken along section 5-5 of FIG. 5B.
Figure 6:
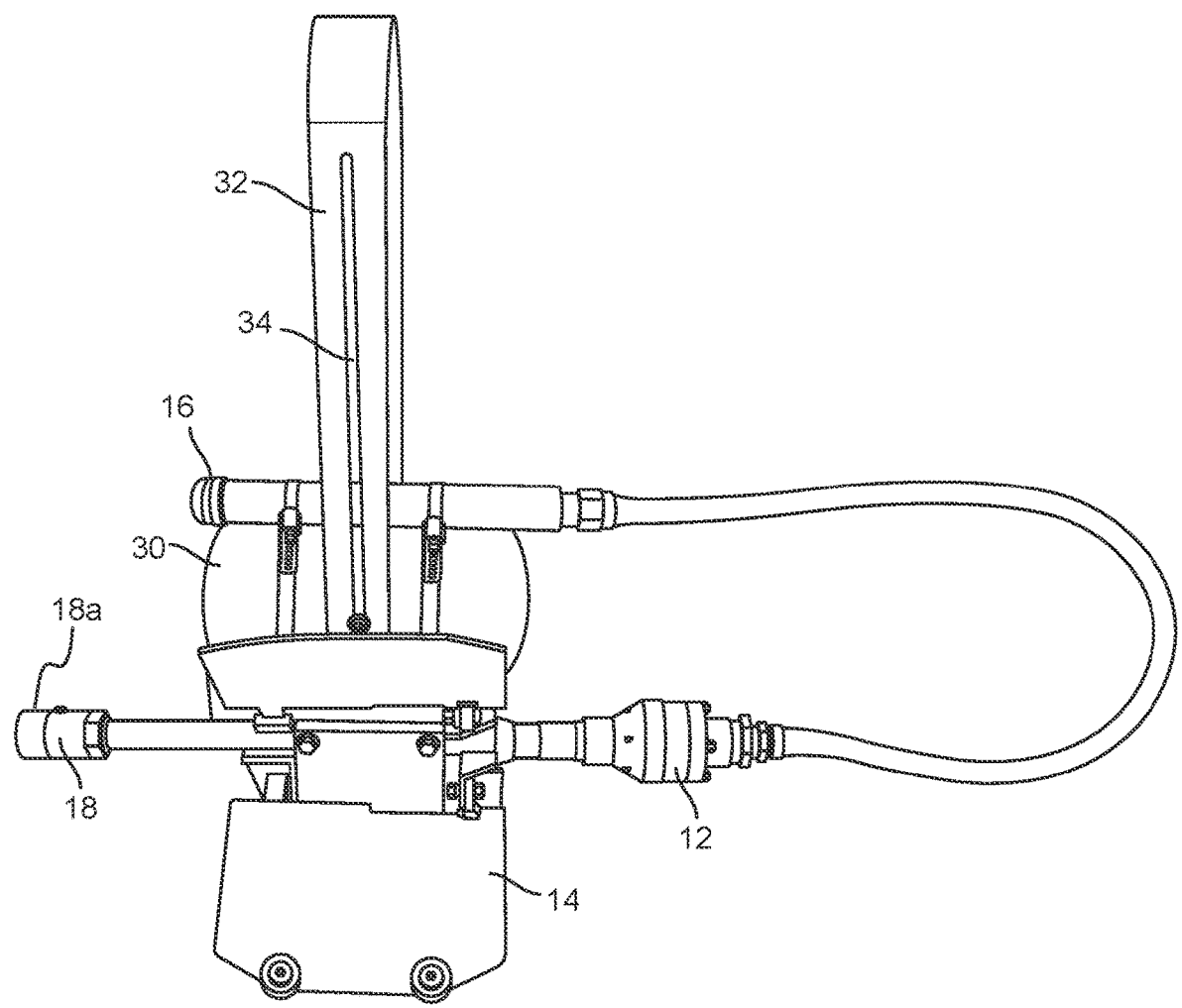
FIG. 6 is a side, slightly elevated view of another pipe treatment apparatus in accordance with another embodiment of the invention.
Figure 7:
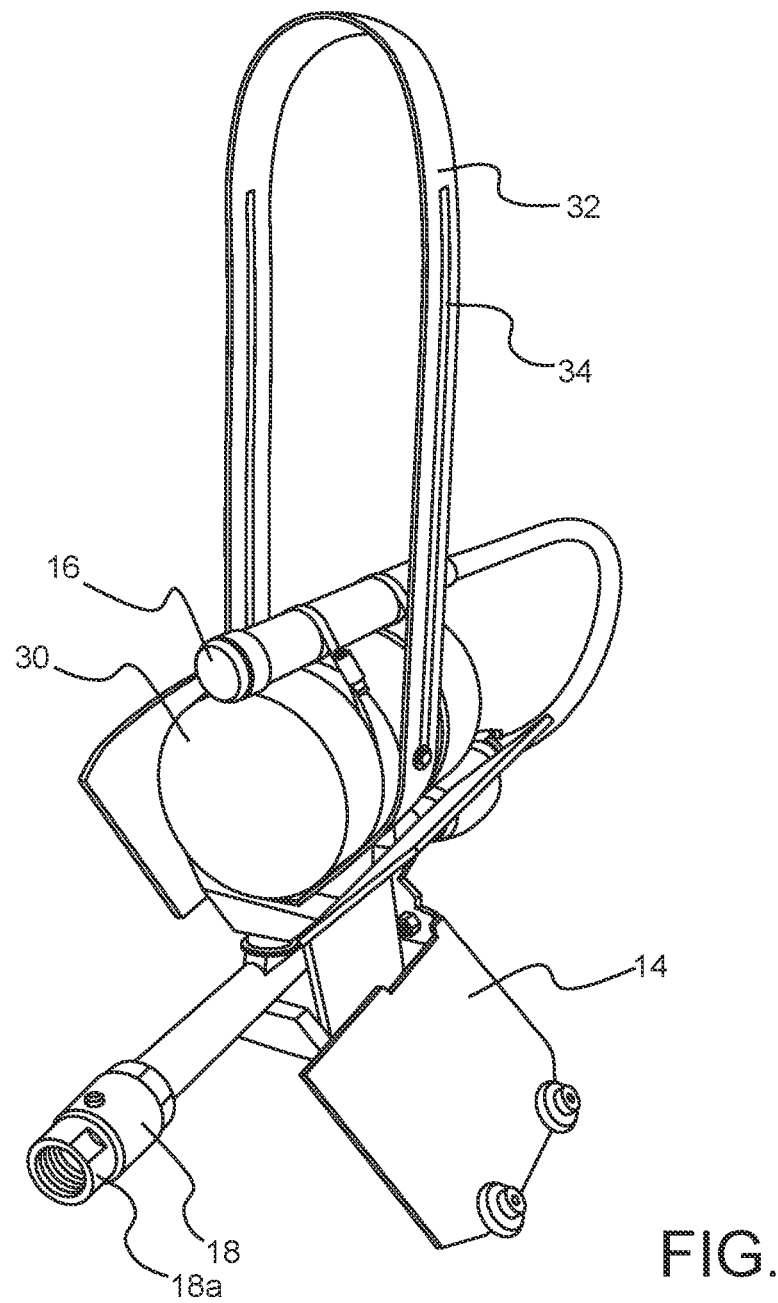
FIG. 7 is another view of the pipe treatment apparatus shown in FIG. 6.

In accordance with another aspect of the invention, the present technology also provides a manner of retrofitting an existing treatment system. For example, in the Prior Art system shown in FIG. 1, the nozzle 120 includes a cage or cover that protects the valve 122 while allowing foam generated by the valve to disperse outwardly from the valve. The present technology can include an adapter (23 in FIG. 2A, for example) that can be installed upon a preconfigured nozzle 120 while not interfering with operation of the valve 122. This adapter can be fluidly coupled to the dispensing tip 16 to create a closure about the dispensing tip. The orifice 24 then restricts flow from the dispensing tip in a controlled direction, magnitude and amount. In this manner, the present technology can be readily incorporated into existing systems to vastly improve the performance of the existing systems.

While a camera system is not shown in the detail in the figures, the present invention provides many advantages that allow the present assemblies to be used with a camera system. As discussed above, many conventional systems require the formation of a foam "slug" to treat the internal portions of the pipe. This foam slug effectively blocks line of sight within the pipe—thus, utilizing camera systems with conventional foam slug technology can be problematic. The present technology does not require the formation of a foam "slug," and so is much better suited for use with a camera system. This can advantageously allow an operator to apply the chemical agent to only very specific locations within the pipe. This leads to even more efficient use of chemical and even further reduction of unwanted chemical introduced into the fluid carried by the pipe. As the system operates well without the formulation of a large slug, it can be easily adapted for use with a camera system: a camera can be positioned near the skid assembly, behind or upstream of the skid assembly, for example, to allow an operator to remotely monitor operation of the system.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

The invention claimed is:

1. A system for applying a chemical agent within a pipe, comprising:
    a skid assembly, moveable longitudinally within the pipe, the skid assembly having a bottom positionable on a bottom, internal portion of the pipe;
    a delivery nozzle carried by the skid assembly and coupleable to a chemical agent supply; and
    a dispensing tip, carried by the delivery nozzle, the dispensing tip being configured to deliver a controlled stream of chemical agent within the pipe toward an internal surface of the pipe, the dispensing tip being held at or above a surface of fluid carried along the bottom, internal portion of the pipe while at least a portion of the skid assembly is positioned below the fluid surface;
    the dispensing tip being limited from delivering the chemical agent downwardly toward the bottom of the skid assembly such that the dispensing tip delivers the controlled stream of chemical agent upwardly away from the bottom surface of the pipe and upwardly away from the fluid surface.

2. The system of claim 1, wherein the skid assembly includes a central body and further comprising at least one fin extending from the central body, the at least one fin operable to space the central body from the internal portion of the pipe.

3. The system of claim 2, wherein the skid assembly includes a plurality of fins carrying the central body.

4. The system of claim 2, further comprising a riser assembly extending upwardly from the central body, the riser assembly carrying the dispensing tip so as to elevate the dispensing tip above the central body of the skid assembly.

5. The system of claim 4, wherein the dispensing tip is slidably carried by the riser assembly to allow vertical adjustment of a height of the dispensing tip relative to the central body of the skid assembly.

6. The system of claim 5, further comprising a float carrying the dispensing tip, the float elevating the dispensing tip relative to the surface of the fluid within the pipe.

7. The system of claim 1, further comprising a rotatable coupler carried by the skid assembly, the rotatable coupler being coupleable to the chemical agent supply to allow the skid assembly to rotate relative to the chemical agent supply.

8. The system of claim 1, wherein the chemical agent supply includes an external chemical agent supply.

9. A system for applying a chemical agent within a pipe, comprising:
    a skid assembly, moveable longitudinally within the pipe, the skid assembly having a central body;
    a delivery nozzle carried by the skid assembly and fluidly coupleable to a chemical agent supply; and
    a dispensing tip, carried by the delivery nozzle, the dispensing tip being configured to deliver a controlled stream of chemical agent within the pipe toward an internal surface of the pipe, the dispensing tip being held at or above a surface of fluid carried along a bottom, internal portion of the pipe while at least a portion of the skid assembly is positioned below the fluid surface;
    the dispensing tip being limited from delivering the chemical agent downwardly toward a bottom of the skid assembly such that the dispensing tip delivers the controlled stream of chemical agent upwardly away from the bottom surface of the pipe and upwardly away from the fluid surface;
    one or more blades extending from the central body, the blades operable to space the central body from the internal portion of the pipe.

10. The system of claim 9, further comprising a riser assembly extending from the central body, the riser assembly carrying the dispensing tip so as to elevate the dispensing tip above the central body of the skid assembly.

11. The system of claim 10, wherein the dispensing tip is slidably carried by the riser assembly to allow vertical adjustment of a height of the dispensing tip relative to the central body of the skid assembly.

12. The system of claim 11, further comprising a float carrying the dispensing tip, the float elevating the dispensing tip relative to the surface of the fluid within the pipe.

13. The system of claim 9, further comprising a rotatable coupler carried by the skid assembly, the rotatable coupler being coupleable to the chemical agent supply to allow the skid assembly to rotate relative to the chemical agent supply.

14. The system of claim 9, wherein the chemical agent supply includes an external chemical agent supply.

* * * * *